United States Patent [19]
Hickey

[11] Patent Number: 5,971,329
[45] Date of Patent: Oct. 26, 1999

[54] CONDUIT SUPPORT

[75] Inventor: Gary S. Hickey, Germantown, Ohio

[73] Assignee: 3244 Corporation, Oak Lawn, Ill.

[21] Appl. No.: 08/754,063

[22] Filed: Nov. 20, 1996

[51] Int. Cl.[6] .................. A47G 29/00; F16L 3/00
[52] U.S. Cl. ................ 248/68.1; 248/56; 248/65; 248/316.7
[58] Field of Search ............ 248/68.1, 65, 316.2, 248/316.3, 316.7, 74.1, 74.2, 56, 909

[56] References Cited

U.S. PATENT DOCUMENTS

| | | | |
|---|---|---|---|
| 2,661,483 | 12/1953 | Tortorice | 248/68.1 |
| 2,843,363 | 7/1958 | Mailander | 248/68.1 |
| 2,855,648 | 10/1958 | Jansson | 248/68.1 |
| 2,873,082 | 2/1959 | Gillespie | 248/316.7 |
| 3,132,831 | 5/1964 | Stamper | 248/68.1 |
| 3,226,069 | 12/1965 | Clarke | 248/68.1 |
| 3,964,707 | 6/1976 | Lewis | 248/68.1 |
| 4,957,251 | 9/1990 | Hubbard . | |
| 5,267,710 | 12/1993 | Condon | 248/56 |
| 5,443,232 | 8/1995 | Kesinger et al. . | |
| 5,564,659 | 10/1996 | DeCapo . | |
| 5,615,850 | 4/1997 | Cloninger | 248/68.1 |

FOREIGN PATENT DOCUMENTS

| | | | |
|---|---|---|---|
| 2557388 | 6/1985 | France | 248/56 |

Primary Examiner—Victor N. Sakran
Attorney, Agent, or Firm—Donald P. Gillette

[57] ABSTRACT

An elongated conduit support to suspend a plurality of conduits from an overhead structure includes a generally flat, elongated central plate having with a plurality of closed-perimeter conduit holes to receive conduits therethrough. The elongated plate has strengthening flanges extending along its longitudinal edges of the central plate to prevent buckling of the central plate due to the weight of the conduits and suspension-receiving means including at least first and second passageways, each of which is generally parallel to the central plate and close to the plane of the central plate and perpendicular to the longitudinal side edges to hold the plate so that its plane is substantially vertical and to transfer the weight of the conduit support and the conduits thereon to the suspension means.

36 Claims, 7 Drawing Sheets

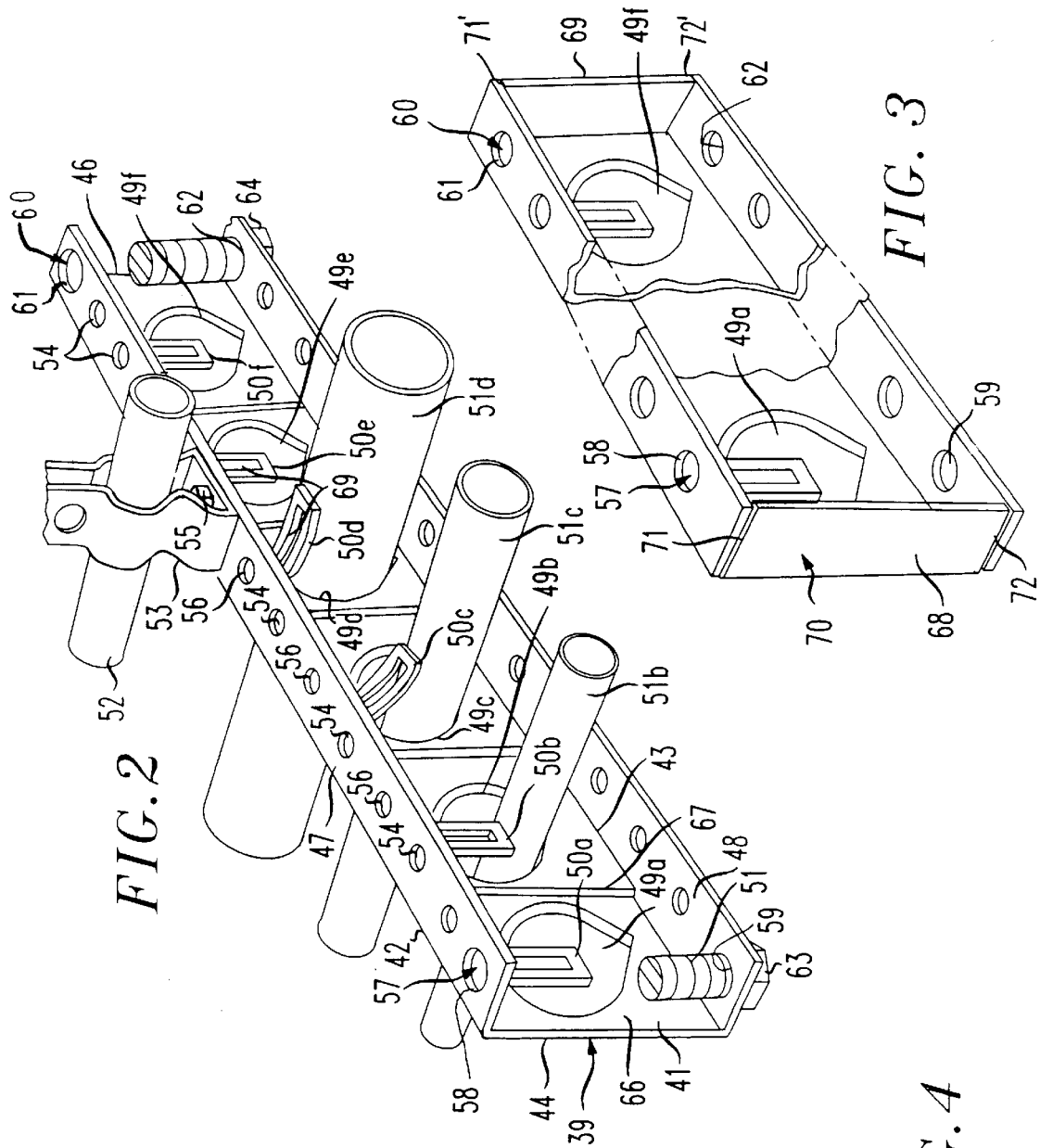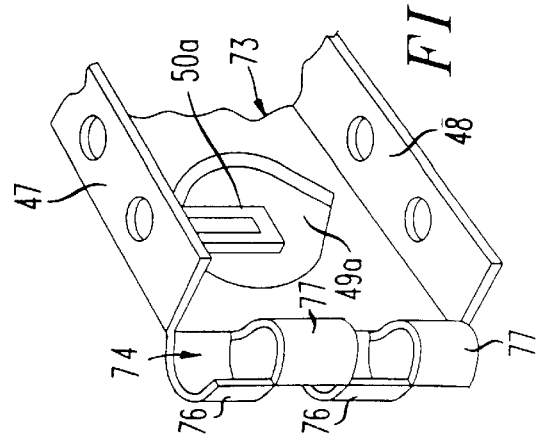

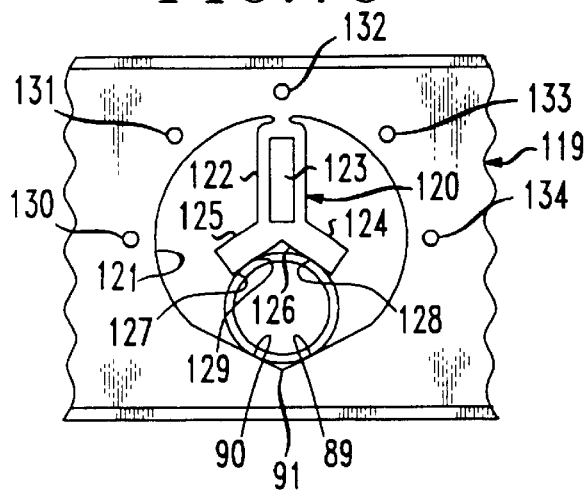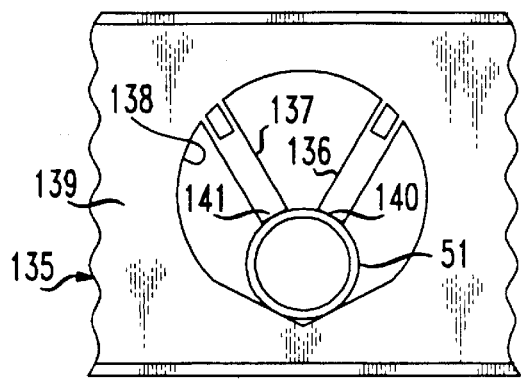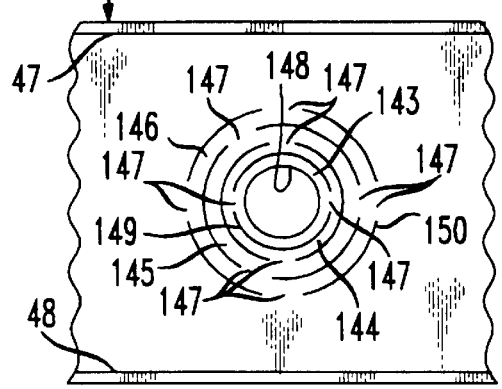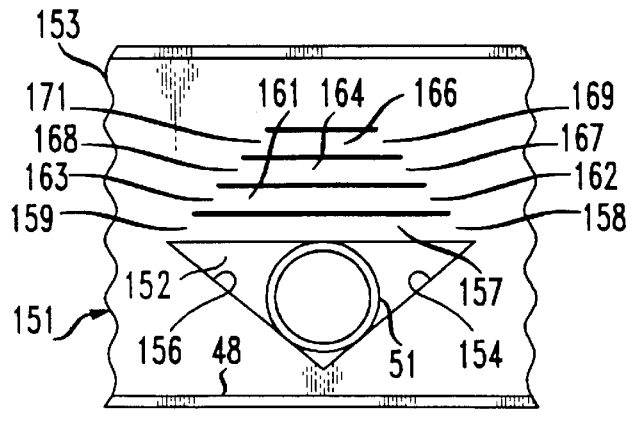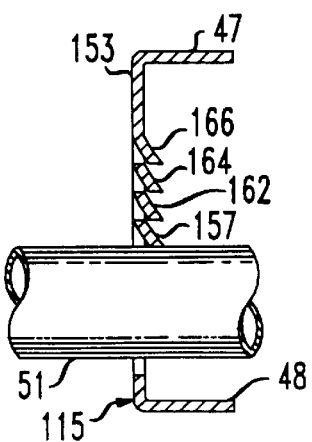

CONDUIT SUPPORT

BACKGROUND OF THE INVENTION

1. Field of the Invention

This invention relates to a conduit support to be attached to a building structure to support a plurality of conduits having electrical conductors enclosed in them. In particular, it relates to a conduit support that can be used either as a trapeze bar suspended from an overhead part of the building structure or as a support directly attached to a rigid part of the building structure.

2. The Prior Art

It is common in the wiring installations in commercial buildings to arrange a group of conduits so that they extend generally parallel to each other for relatively long distances in or close to the same plane. According to the National Electrical Code promulgated by the National Fire Protection Association, such conduits must be supported at regular intervals.

A typical conduit supporting structure, commonly referred to as a trapeze because of its appearance, consists of at least two suspension members spaced apart from each other and extending downwardly from an overhead structure with a conduit support bar attached at or near the lower ends thereof to be held in a horizontal position by the bar. The conduit support bar must be strong enough to allow several conduits to be supported on it or suspended from it without appreciably bending it in response to the combined weight of the conduits and the conductors within them. The suspension members, while usually not flexible, are subjected only to longitudinal tensile stress and thus need not be as resistant to transverse stress as the support bar. It is important that the conduits be held in fixed, selected locations on the support bar, and this has been accomplished heretofore by individual clamping means that are individually attached to the bar as the trapeze is assembled.

One of the problems with such trapeze structures is that the bars are cut to the desired length on the job, not beforehand, and that the individual clamping devices that fit the bar and hold the conduits in place are selected and assembled with the bar and the conduits. This requires the electricians to spend time doing such cutting, selecting, and assembling of the components for each trapeze.

OBJECTS AND SUMMARY OF THE INVENTION

It is an object of this invention to provide a conduit support that can be attached, as a unit, to the structure of a building to provide stable means of convenient length and sufficient strength to carry a number of parallel conduits and to hold them in specific, spaced positions relative to each other.

Another object is to provide convenient means for preventing the conduits held in the conduit support of this invention from moving loosely with respect to other conduits or to the support, itself.

Another object is to provide a conduit support in which the means for preventing the conduits from moving loosely are formed integrally with the conduit support.

Another object is to provide a conduit support having apertures formed integrally with the support and through which conduits of any type can be longitudinally inserted to be held in either a horizontal or a vertical array and spaced transversely from one another by a predetermined distance as measured along the conduit support.

Still another object is to provide a conduit support from which conduits cannot be removed transversely relative to their longitudinal direction.

A further object is to provide multiple-conduit supports that can be easily separated into modular lengths.

Yet another object is to provide a convenient location for mounting junction boxes or other components above, as well as below, the support bar of a trapeze.

Those who are skilled in the technology with which this invention deals will recognize further objects after studying the following description.

An elongated conduit support in accordance with this invention comprises a generally flat, elongated central plate, i.e., one that has transverse end edges shorter than its longitudinal side edges. The central plate has a plurality of conduit holes in defined areas spaced apart along its length to receive the conduits and thus determine their spacing from one another and to prevent their being moved out of the respective defined area in a direction parallel to the plate or, in particular, from being moved entirely out of engagement with the plate. To keep the conduits from moving around in the respective conduit holes in which they are supposed to be held stationary, conduit-restraining means are positioned to extend at least part way across the defined areas to exert pressure in a direction to force the conduits toward a selected part of the perimeter of their respective holes. First and second flanges along the longitudinal side edges of the central plate strengthen the conduit support, particularly in the plane of the central plate, to prevent buckling of the central plate due to the weight of the conduits.

The conduit support may also have means to receive suspension members on which the conduit support can be held. The suspension-receiving means typically define at least first and second passageways, each of which is generally parallel to the central plate and close to the plane of the central plate and perpendicular to the longitudinal side edges to transfer the weight of the conduit support and the conduits thereon to the suspension means.

The invention will be described in greater detail in connection with the drawings, in which like serial numbers in different figures indicate the same item as was shown in a previous figure or at least an item that performs the same function as was previously described in connection with an item having the same reference numeral.

BRIEF DESCRIPTION OF THE DRAWINGS

FIG. 2 is a perspective view of one embodiment of support means constructed in accordance with this invention to hold a number of conduits in fixed, spaced relationship.

FIG. 3 is a fragment of a modified embodiment of a conduit support in accordance with this invention.

FIG. 4 shows a fragment of another embodiment of a conduit support in accordance with this invention.

FIG. 13 is a frontal view of a fragment of a conduit support similar to that in FIG. 5 provided with yet another form of hold-down tab.

FIG. 14 is a frontal view of a fragment of a conduit support incorporating two hold-down tabs.

FIG. 15 shows a frontal view of a fragment of a conduit support incorporating yet another form of conduit-holding structure.

FIG. 16 shows a frontal view of a fragment of a conduit support with a modified form of conduit-holding structure.

FIG. 17 is a side view of the conduit support in FIG. 16.

DETAILED DESCRIPTION OF A PREFERRED EMBODIMENT

Figure 1:
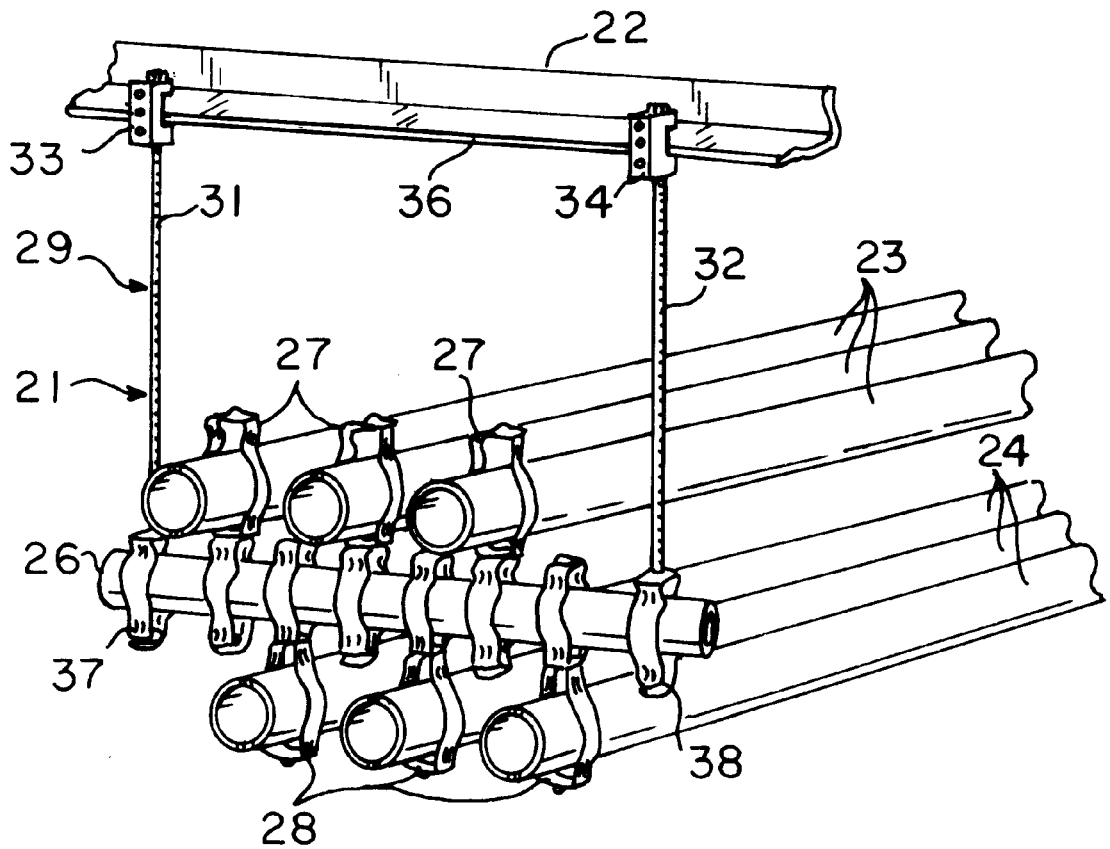
FIG. 1 is a perspective view of one of many types of prior-art trapezes supporting a number of parallel conduits.

FIG. 1 shows a typical trapeze 21 suspended from a beam 22 and holding a plurality of parallel conduits 23 and 24 in one of the many ways known prior to this invention. In this embodiment, all of the conduits 23 and 24 happen to have the same diameter, but that is not always the case. The conduits in this figure are in two groups: conduits 23 are located above a support member, or bar, 26 and conduits 24 are suspended below the support member. In this instance, the support member 26 is another piece of conduit and the conduits 23 of the upper set are held in place on it by means of a first set of identical conduit clips 27 to prevent movement of the conduits, either longitudinally or transversely. If the support member is something other than a piece of cylindrical conduit, conduit clips suitable for use with such other support member configurations are employed. For example, it is common to use a length of strut as the support member and to use strut straps to hold conduits in place on the strut.

The conduits 24 are held in place below the support member 26 by another set of conduit clips 28. Since the conduits 24 in this figure have been indicated as having the same diameter as the conduits 23, the conduit clips 28 may be identical with the conduit clips 27. However, the fact that the conduits 24 are suspended from the pipe causes the stress on the conduit clips 28 to be different than on the conduit clips 27. As a result, an electrician setting up the prior art system in FIG. 1 may need to have not only several sizes of conduit clips but also conduit clips of different strengths.

The trapeze 21 includes suspension means 29, which, in this embodiment, comprises a pair of threaded suspension rods, or all-threads, 31 and 32. The upper ends of the rods are threaded into beam clamps 33 and 34, respectively, clamped to a flange 36 of the beam, and the lower ends of the rods are screwed into conduit clips 37 and 38 that may be of a different type than the conduit clips 27 and 28. The total weight of the support member and the conduits 23 and 24 carried on it is limited by the weight that the beam clamps and the conduit clips 37 and 38 can carry.

The embodiment shown in FIG. 1 is only one of a virtually limitless variety of embodiments currently being utilized, and it illustrates only a few of the components that an electrician constructing an electrical installation currently must have immediately available for constructing trapezes.

FIG. 2 shows a simple conduit support 39 in accordance with one embodiment of this invention. This conduit support includes a generally flat, elongated central plate 41 that has first and second longitudinal side edges 42 and 43 and first and second end edges 44 and 46 that are shorter than the side edges. First and second flanges 47 and 48 extend from the longitudinal side edges of the central plate to define, with the central plate 41, a channel having a generally U-shaped cross-sectional configuration. In this embodiment, the flanges are flat and parallel to each other and perpendicular to the central plate. The central plate 41 has conduit holes 49a–49f in defined areas spaced apart along its length. Although all of these conduit holes in this embodiment are the same size and are spaced along the central plate in a straight line, it is not necessary that they be so arranged. The central plate 41 can be wide enough to accommodate more than one line of conduit holes, some of which may be only large enough to accept relatively small conduits while others are large enough to accept larger conduits.

Adjustable conduit-restraining means, or hold-down tabs, 50a–50f are formed integrally with the central plate 41 to extend at least part of the way across each of the conduit holes 49 to hold any conduit stationary in the respective conduit holes 49b–49d by pressing the conduit against the bottom part of the conduit hole, as illustrated by conduits 51b–51d. There are no conduits shown in the other holes 49a, 49e, and 49f, which is illustrative of the fact that virtually every installation has its own requirements and may have different numbers of conduits running parallel to each other at different locations, even in the same building. The support 39 is shown with six conduit holes, which will be more than enough for many installations but not enough for others. Accordingly, the conduit support 39 illustrated in this figure may be a modular section of a longer conduit support formed with an integral number of members like the support 39 joined end-to-end and divided on the job into lengths such as that shown in FIG. 2.

The number of conduit holes in a conduit support may be determined by the dimensions of the sheet metal out of which the conduit support is formed, and it may also be determined by whether a conduit support is to be used to hold small-diameter conduits or those with large diameters. It is easier and more economical to produce and stock a limited number of conduit supports of standard sizes and to have some of the conduit holes unused in most instances than to stock a far larger number of conduit supports that have exactly the number and size of conduit holes required at each point in every installation. In any case, all types of conduits, EMT, IMC, and rigid, can be accommodated in the various embodiments of conduit supports of this invention.

The conduit 51b illustrates a conduit of minimum diameter for the hole 49b, and all of the tabs, as indicated by the tab 50b, are made just long enough to touch the upper surface of the smallest conduit. The conduit 51c is somewhat larger than the conduit 51b, and in order for it to be inserted in the hole 49c (or any of the other conduit holes), the tab 50c that extends part of the way across that hole must be bent, or deflected, a little. The conduit 51d is an example of the maximum size that can pass through the holes 49 in this particular central plate 41, and in order to allow it to do so, the tab 50d in that hole is shown deflected a maximum amount so that its end is almost parallel to the flange 47.

If there are more conduits to be run along together than the number of conduit holes in the available conduit support, and especially if the additional conduits have a larger diameter than can be accommodated in the holes 49 of the available conduit support 39, the additional conduits can be supported on top of or beneath the conduit support as illustrated by a conduit 52 held in a suitable conduit holding device, such as a minnie 53, which is held in place on the flange 47 by a self-tapping sheet metal screw or by a bolt (not visible) that passes through a hole 54 in that flange and is retained in place by a nut 55 or by an impressed thread formed in the flange. The flange 47 has a plurality of holes 54, each midway between another set of similar holes 56. The centers of the holes 56 are co-planar with the vertical center lines of each of the conduit holes 49, and so the holes 54 and any screws that pass through them are accessible from below the support 39 even if there is a conduit in each of the conduit holes. This permits conduit clips, such as the minnie 53, to be attached and tightened in place even after conduits have been put in all of the conduit holes 49. If the minnie 53 (and similar minnies at other locations on the upper flange 47) is attached before the conduits are inserted through the holes 49a–49f, those minnies can be attached by screws through the holes 56. Other conduits can be suspended beneath the support 39 by means of similar minnies attached by screws through any of the holes 54' and 56' in the lower flange 48.

The support 39 has a first passageway 57 defined by holes 58 and 59 in the flanges 47 and 48 to be perpendicular to the longitudinal side edges 42 and 43 and adjacent the first end edge 44 to permit the first suspension rod 31, only a part of which is shown, to pass through. Adjacent the second end edge 46 is a second passageway 60 defined by holes 61 and 62 in the flanges 47 and 48 to be perpendicular to the longitudinal side edges 42 and 43. The passageways 57 and 60 are just large enough to allow the rods 31 and 32 to pass through with little room to spare. Holding means 63 and 64, such as nuts, grip the rods firmly just below the lower flange 48 by being screwed onto the rods to retain the conduit support in place.

It is desirable that the passageways 57 and 60 be close to the central plate 41 so that as much as possible of the weight of the whole structure, including the conduits, can be transferred to the central plate and not allowed simply to bend the lower flange 48. Specifically, if the first passageway 57 is defined simply by the holes 58 and 59, it is desirable that the centers of these holes be spaced from the front surface 66 of the central plate (the surface that faces in the same direction as the flanges 47 and 48) by a distance not substantially greater than the radius of those holes. This causes the rod 31 to be as close to the central plate as possible, so that the edge 43 of the central plate 41, near the corner where it intersects the side edge 43, will bear directly down on the nut 63. The passageway 60 should be formed in a similar manner.

In the embodiment in FIG. 2, the central plate 41 is shown as having reinforcement means in the form of integral ridges 67 perpendicular to the side edges 42 and 43. It is not necessary to have these ridges on the plate 41, but if they are used, they strengthen the plate against buckling if too much weight is applied to it by way of the conduits, especially if the support 39 has to carry additional conduits 52 on top of the flange 47.

Other means can be used to reinforce the flanges and the central plate to minimize any distortion thereof. For example, end flaps 68 and 69 extending from the end edges 44 and 46 of the central plate can be folded forward, as shown in FIG. 3, to form a conduit support 70 in the shape of a shallow box instead of the shallow, open-ended channel of U-shaped cross section shown in FIG. 2. Preferably, the end flaps in FIG. 3 are folded in far enough to place their respective upper edges 71 and 71' and their respective lower edges 72 and 72' between the flanges 47 and 48 so that upward pressure via the nuts 63 and 64 shown in FIG. 2 will be conveyed by the end flaps 68 and 69 as upward pressure on the under surface of the ends of the upper flange 47. The support rod holes 58 and 59 for the passageway 57 and the suspension rod holes 61 and 62 for the passageway 60 can be farther from the central plate than in the embodiment in FIG. 2.

FIG. 4 shows a fragment of yet another alternative form of conduit support 73 having a passageway 74 formed of several short semi-cylindrical sections 76 and 77 facing in opposite directions. The radius of each of these semicircular sections is preferably just large enough to accommodate one of the support rods, such as the rod 31 in FIG. 2, and the axis common to all of the sections 76 and 77 is preferably in a plane common to the central plate 41.

Figure 5:
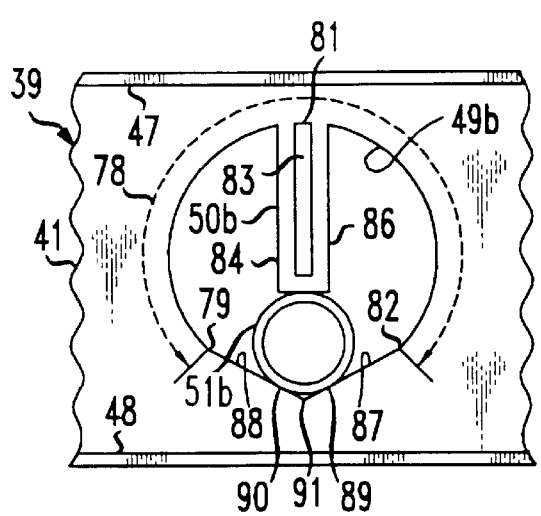
FIG. 5 is a frontal view of a fragment of the conduit support in FIG. 2 to illustrate the arrangement of one form of conduit hole.
Figure 6:
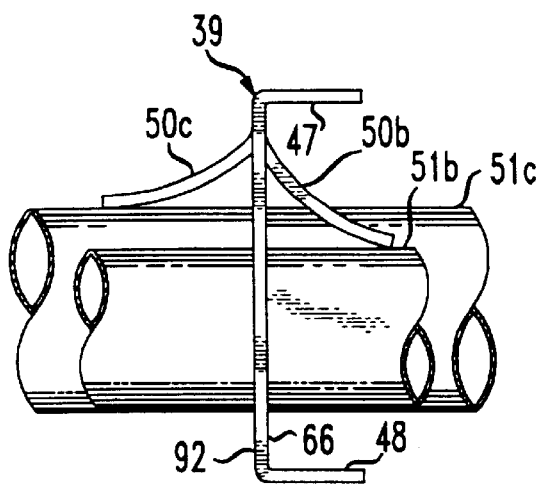
FIG. 6 is a side view of a conduit support similar to that in FIG. 5 showing tabs bent to different extents to hold conduits of different diameters in place.

FIGS. 5 and 6 are illustrative of typical dimensional relationships in a support 39. The frontal view of a fragment of the conduit support 39 in FIG. 5 shows only enough of the central plate 41 to include one of the conduit holes 49b. This hole has its perimeter defined, in part, by an arc 78 that is shown as a broken line and has a constant radius starting at a point 79 and continuing clockwise, past the topmost point 81, to a point 82. Considering the point 81 as being located at 0°, the point 79 is at about 210° and the point 82 is at about 150°, making the total length of the arc about 300°. There is an interruption in the arc 78 at the point 81 where the tab 50b extends down. This tab is shown as having an elongated central slot 83 between two side parts 84 and 86 of the tab 50b. In this embodiment, the slot is almost as long as the tab.

The lowest part of the perimeter of the conduit hole 49b consists of two edges 87 and 88 shown in this embodiment as being straight, although they need not be precisely so. Their purpose is to provide two locations 89 and 90 against which any conduit 51b small enough to pass through the conduit hole 49b can rest or be pressed to keep it from moving around in the hole due to vibration of the conduit support. The bottom of the tab 50b forms a third locating point by pressing on the uppermost part of the conduit 51b to stabilize the location of the conduit.

The edge 87 is tangent to the arc at approximately the 150° point 82 and thus extends downward and to the left at an angle of about 30° to the horizontal. The other edge 88 is tangent to the arc 78 at approximately the 210° point 79 and thus extends downwardly and to the right at an angle of about 30° to the horizontal to intersect the first edge 87 at the lowest point 91 of the perimeter, thereby defining a Vee with an apex at the point 91 and an included angle of about 120°.

The reason for not having the edges 87 and 88 meet at an angle much less than about 120° is that it is important not to weaken the conduit support by removing too much of the central plate 41 just above the Vee. At the same time, the angle should not be much greater than 120°, because it is desirable that the two contact locations 89 and 90 between the conduit and the edges 87 and 88 forming the Vee be far enough apart to give sufficient side-to-side stability to restrain the conduit as the tab 50b presses down on it. An angle between about 100° and 140° meets these criteria.

The end view of the support 39 in FIG. 6 shows one of the tabs 50b bent toward the front side 66 of the support 39, which may be due to the pressure of the conduit 51b as it is thrust from the rear of the conduit support into position. Alternatively, the tab may be bent by hand by the person installing the conduit support. The conduit 51c, on the other hand, has been thrust into its respective conduit hole from the front of the support 39, causing the tab 50c to be bent away from the front surface 66 of the central plate 41 and toward the rear surface 92 and illustrating that a conduit can be inserted from either the front or the rear of the conduit support.

Conduits used in electrical wiring installations are produced in several standard sizes, the smallest of which has an outer diameter (O.D.) of 13/16" and the largest of which in general use has a 4½" O.D. While the conduit holes 49 could be large enough to accommodate all conduits from the smallest to the largest, that would require the tabs 50 in the largest conduit holes to be long enough to press on the uppermost surface of the smallest conduit. It is preferable to produce conduit supports in two or three sizes. For example, if the radius of the arc 78 of the conduit hole 49 is about ⅞", the hole can accommodate conduits having standard sizes ranging from 13/16" O.D. to 1⅝" O.D. For this range of conduit sizes, the length of each tab 50 should preferably be about 1⅛", which would cause the tab to extend about 9/16" below the center of a conduit hole of this size. The apex 91 of the Vee would be about 1" below the center of the circle of which the arc 78 is only a part. Considered in another way, the height of the Vee, i.e., the distance from the apex 91 to the 180° point, if the circular arc 78 were completed into a full circle, would be ⅛".

The full range of standard conduit sizes can be conveniently accommodated in three sizes of conduit supports, as listed in the following Table in which the arc 78 for the smallest conduits has a radius of about ⅞", or a diameter of about 1¾", and a Vee height of about ⅛", the arc 78 for middle-sized conduits has a diameter of about 3⅛" and a Vee height of about ¼", and the arc 78 for the largest conduits has a diameter of about 4¾" and a Vee height of about ⅜".

TABLE

| 1¾" dia. 7/64" Vee Tab 1⅛" long | 3⅛" dia. 13/64" Vee Tab 2⅜" long | 4¾" dia. ⅜" Vee Tab 3¼" long |
|---|---|---|
| 1⅝" O.D. conduit | 2⅞" O.D. conduit | 4½" O.D. conduit |
| 1 5/16" O.D. conduit | 2⅜" O.D. conduit | 4" O.D. conduit |
| 1 1/16" O.D. conduit | 1⅞" O.D. conduit | 3½" O.D. conduit |
| 13/16" O.D. conduit | 1⅝" O.D. conduit | 2⅞" O.D. conduit |
|  | 1 5/16" O.D. conduit | 2⅜" O.D. conduit |
|  | 1 1/16" O.D. conduit | 1⅞" O.D. conduit |

It may be noted that all of the conduits listed in the second column of the Table could be accommodated in conduit supports of either the first or the third columns, if stocking the minimum number of different sizes of conduit supports were of paramount importance.

The tabs 50 have been shown in all of the embodiments considered so far as having a longitudinal central slot 83. Such a slot is not mandatory, but one purpose for having it is to make the tab easier to bend. A conduit support intended to carry only small conduits ranging from 13/16" O.D. to 1⅝" O.D. may be formed of galvanized sheet steel of 16 gauge, and the tabs 50 in such a conduit support are relatively easy to bend by hand or with the assistance of pliers, even without a central slot. But if the support 39 is to carry a number of heavy conduits, such as eight conduits of 4" or 4½" O.D., each enclosing a maximum number of electric conductors of the largest permissible size, it may need to be constructed of 12 gauge steel. Conduit supports capable of carrying small and medium sized conduits may be made of either 16 or 14 gauge galvanized steel, depending on how long the support is and how many conduit holes it has. The tabs formed integrally with a conduit support made of 14 gauge steel are more difficult to bend than those in a conduit support made of 16 gauge, and tabs in conduit supports made of 12 gauge are even stiffer, but this difficulty can be overcome, or at least reduced by means of the slot 83.

The length of the slot tends to define the part of the tab 50 that will be bent; if the length of the tab 50 is about 1⅛" and its width at the point at which it joins the central plate 41 of the support 39 is about ½" and the slot 83 is short, having a length only about ⅜" and a width of about ⅛", the tab will bend relatively sharply in the two side parts 84 and 86 of the tab on each side of the short slot. But if the slot 83 is almost as long as the tab, for example, about 1" long, and the other dimensions of the tab stay the same, the bend will be spread out over more of the length of the tab, and the amount of force required to produce a given amount of displacement of the end of the tab will be less.

It should be noted that the slot can be eliminated entirely and the flexibility of the tab 50 determined by its width, which need not be uniform, and its thickness. I have found that it is satisfactory for the 1⅛" long tabs in the conduit support for the smaller conduits in the first column in the Table to have a uniform width of ½" from top to bottom. The tabs about 2⅜" long to be used in conduit supports for the middle-sized conduits listed in the second column are satisfactory if their width at the top is about ⅝" and tapers outwardly to a width of about ¾" at the bottom. The tabs listed in the third column as being about 3¼" long have been found to be satisfactory if their width tapers outwardly from about ⅝" at the top to about 1" at the bottom. The slot in all of the tabs listed in the Table starts at the top of the respective tab and is about ⅛" wide and about ½" long. While the foregoing dimensions have been found to be satisfactory, they should not be considered as limitations on the invention.

Figure 7:
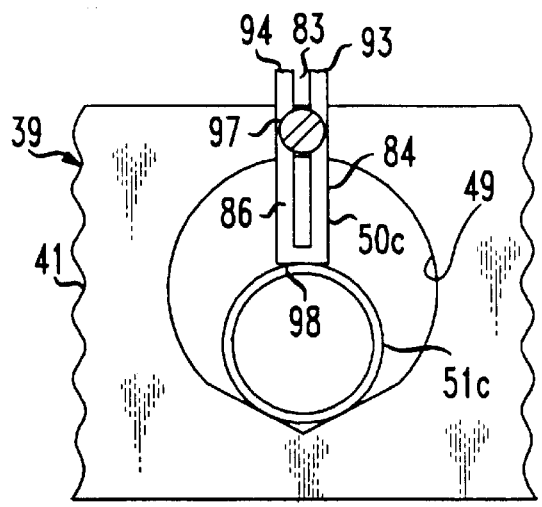
FIG. 7 shows a rear view of the fragment of the conduit support in FIG. 5 with the tab broken off and affixed to the conduit support to secure a conduit in place.
Figure 8:
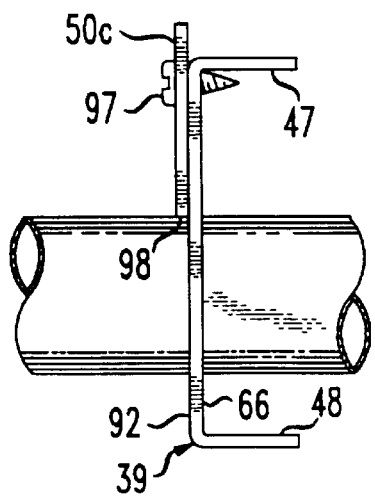
FIG. 8 is a side view of the conduit support and tab in FIG. 7.

FIG. 7 is a view of the support 39 of FIG. 2 from the rear and shows another way of using the tab 50c to hold down the conduit 51c. The tab 50c, which was originally attached to the central plate 41, is shown broken free of it at the ends 93 and 94 of the parts 84 and 86 of the tab that define the edges of the slot 83. The tab thus freed is attached firmly against the rear surface 92 by a screw 97 through the slot. The tab has not been bent, except to break it free, and its use as a hold-down device does not depend on its resilience. In fact, the end of the tab may be pressed perpendicularly down upon the upper surface of the conduit 51c and held there as the screw 97 is being tightened, thus holding the conduit more firmly in place than would be possible merely by the resilient pressure of the tab if the tab were merely bent and not broken free. However, since the upper part of the tab 50c must overlap part of the conduit support 39 in order to be gripped firmly by the screw 97 and even may extend above the top surface of the support, as shown by the ends 93 and 94, the tab should be made longer than merely being long enough to touch the uppermost surface of the smallest conduit to be held by that conduit support. Instead, the tab should be made long enough to extend almost all of the way across the conduit hole 49 before the tab is broken free of the support 39. As shown in FIG. 8, which is an end view of the conduit support 39 with the tab attached to the rear surface 92 of the central plate, as shown in FIG. 7, the range of vertical positions of the tab 50c will not be limited by the flange 47 that extends from the front surface 66. By attaching the tab to the rear surface 92, its ends 93 and 94 can extend above the topmost part of the central plate 41. In this figure, the screw 97 that holds the tab 50c rigidly in place on the conduit support is shown as a self-tapping sheet metal screw that can be driven through the central plate 41 without requiring a pre-drilled hole. Alternatively, the screw could be one that uses a pre-drilled guide hole or a machine screw that would require a full-sized, pre-drilled hole and some means, such as a nut or a thread impression, on the other side of the central plate to hold the screw securely in place.

Figure 9:
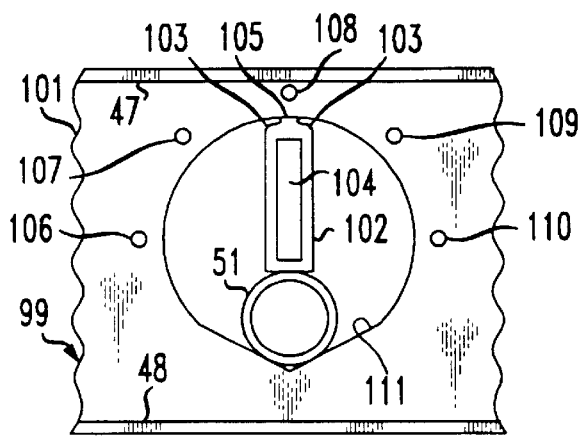
FIG. 9 is a frontal view of a fragment of a conduit support similar to that in FIG. 5 but having a modified form of separable tab.

When the tab 50c is broken off, the slot 83 extends all the way to the ends 93 and 94. As a result, the tab could slip off the screw before the screw was fully tightened. In order to prevent that, FIG. 9 shows a fragment of a conduit support 99 generally similar to the support 39 in FIGS. 7 and 8 but having a central plate 101 with a modified tab 102 that has weakening means in the form of notches 103. A longitudinal slot 104 is closed below these notches so that when the tab is broken free of the central plate 101, the slot 104 will be closed at both ends. The tab 102 may also be weakened by being narrowed at this breaking point by weakening means in the form of a groove 105 in either its front or rear surfaces, or both. When the tab 102 is broken off, the weakening caused by either the notches 103 or the groove 105, or both, makes it easy to break the tab at that point. The broken-off tab has a central slot 104 that is closed at both ends. As a result, when a screw, such as the screw 97, is inserted through the closed slot 104 and has at least started to be tightened in the central plate, the tab cannot fall off, even before the screw has been fully tightened. This is an advantage especially to electricians installing a conduit support 99 far above the floor to which a dropped tab 102 would fall. As in the embodiment of the tab 50c in FIGS. 7 and 8, in order to be long enough to press down on even the conduit of smallest diameter, the tab 102 should be made almost as long as the diameter of the conduit hole in which it is formed.

The central plate 101 is shown as having several holes 106–110, which may be either guide holes or full-sized holes to accommodate a machine screw and are located around a conduit hole 111 and just outside its perimeter, allow the tab 102 to be placed at any one of several angles to the vertical so that the flange 47 will not interfere with placement of the tab.

Figure 10:
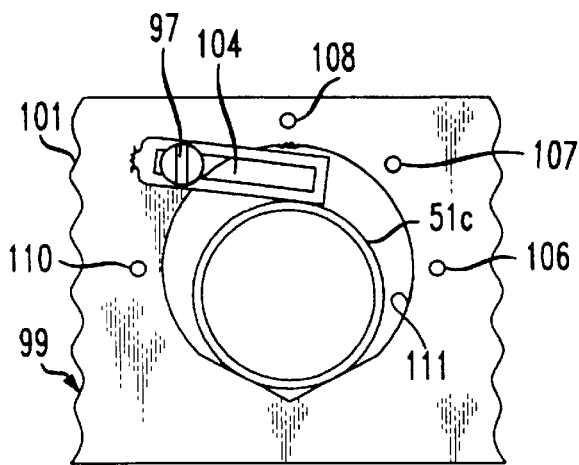
FIG. 10 is a rear view of a fragment of a conduit support similar to FIG. 9 with the separable tab broken free of its original position on the conduit support and attached to the conduit support by means of a screw to secure a conduit in place.

FIG. 10 shows the rear side of the conduit support 99 with the tab 102, after having been broken from the location 100, extending nearly horizontally along the longitudinal direction of the conduit support but sloping enough to press down upon the conduit 51c. The reason the tab is secured to the rear surface of the central plate 101 by the screw 97 in the hole 109 is that the direction of rotation of the screw when it is being tightened increases the downward pressure of the tab 102 on the conduit 51c, as it should. Alternatively, the tab could be held against the front surface of the central plate 101 by a screw entering the plate from the front side. Thus, screws to hold the tabs can be driven into the conduit support 99 either from the front or the back, according to which side is more convenient and results in having pressure applied to the conduit in the correct direction.

Figure 11:
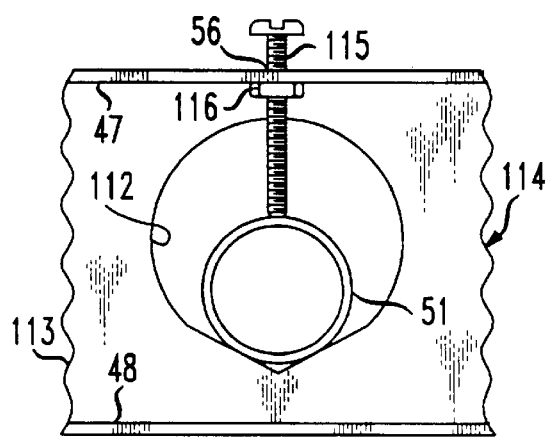
FIG. 11 is a frontal view of a modified form of conduit support using a screw to hold a conduit in place.

FIG. 11 illustrates means for applying stabilizing pressure to the conduit 51 in a conduit hole 112 in a central plate 113 of a modified conduit support 114 by means of a screw 115 driven through one of the holes 56 (FIG. 2) in the flange 47. This screw may be held securely in place by a nut 116 welded to the flange, or by other threaded means, such as a thread impression. Alternatively, the nut 116 may be welded to the rear surface of the central plate. If this arrangement is used to hold the conduit 51 down, there would appear to be no need to create a tab in the conduit hole 112, but if the conduit 51 is much smaller in diameter than the conduit hole 112 through which it is inserted, the screw 115 will have to be quite long. On the other hand, if the conduit is as large as can be inserted through the conduit hole 112, a much shorter screw should be used since, if a long one is used, it will extend far above the top flange 47 of the conduit support 114.

Figure 12:
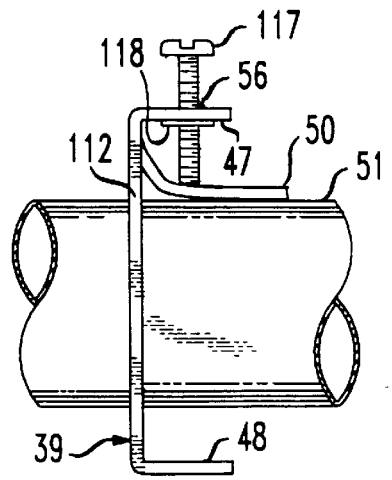
FIG. 12 is a side view of a conduit support similar to that in FIG. 5 or FIG. 9 but using a screw to assist in holding a conduit in a fixed position.

FIG. 12 shows a way to avoid either having to use extremely long screws or having to keep a supply of screws of several different lengths on hand. In this embodiment, the conduit support 39 of FIG. 2 can be used. Conduit supports according to this invention will typically be formed of sheet metal and the tabs formed as integral parts may be retained and used in the manner similar to that shown in FIG. 2. But in FIG. 12, the tab 50 is not only bent to permit the conduit 51 to be inserted in the conduit holes 112 but is pressed firmly against the conduit by a screw 117. For this purpose, the tab need not have an elongated longitudinal slot along its center. Without a slot, it will bend primarily at the end at which it is attached to the central plate, which allows the screw 117 to be shorter than at least the longest screw 115 used in FIG. 11, because the screw 117 need be driven through the flange 47 only far enough to press against the tab 50 rather than having to be driven all the way into contact with the conduit 51. The screw 117 could either be a tech screw that created its own thread in the flange 47, using one of the holes 56 in FIG. 2 as a starting hole, or it could be a machine screw driven through a nut attached to flange 47 in alignment with the appropriate hole 56, as in FIG. 11, or, as illustrated in FIG. 12, it could be secured by a thread impression 118. If a nut is used, it could be welded in place on the flange 47 or on either surface of the central plate 41, or it could be part of a U-shaped spring clip incorporating a thread impression and slid over the edge of the flange 47 in line with a slot at the location of one of the holes 56 or with the hole 56, itself.

FIG. 13 shows a fragment of a modified conduit support 119 with a Y-shaped tab 120 that extends part of the way across a conduit hole 121 from a location diametrically opposite the apex 91. The tab 120 is generally similar to tabs previously described herein in that it has a vertical staff 122 with a slot 123, but it differs in that it has two arms 124 and 125 at its lower end to increase the number of edges bearing on a conduit 51 between these arms and the lower part of the perimeter of the conduit hole 121. Each of these arms extends at an obtuse angle between about 100° and 140° and preferably about 120° to the central part of the tab.

It is not necessary for the conduit hole 121 to have an apex 91; it could be entirely round. Since the two arms 124 and 125 have lower edges 126 and 127 that define a Vee and have two conduit-locating points 128 and 129, respectively, only one more conduit-locating point is required to stabilize a conduit, and thus, any location on its periphery could provide that third conduit-locating point.

While the conduit supports have been described herein as being suspended horizontally as a trapeze bar, a set of horizontal conduits is sometimes arranged so that they are arrayed in some plane other than a horizontal one, for example, in a vertical plane. If the conduit support 119 were attached vertically to a stud or wall or post or the like, each conduit would rest on a curved side of the conduit hole 121, and there would be some tendency for the conduits to roll instead of being held in a fixed position. However, by breaking the tab 120 off of the conduit support 119 and attaching it to the conduit support at an appropriate one of a plurality of holes 130–134 with the angularly disposed edges 126 and 127 pressing the conduit against the curved edge of the conduit hole 121, the conduit would be securely locked in position. In particular, if the conduit support 119 is mounted vertically, the tab 120 can be broken off and attached to the conduit support by a screw through either the hole 130 or the hole 134, depending on which of those two holes is uppermost. The tab would then be positioned to have the angularly disposed edges 126 and 127 press down on the conduit extending through the conduit hole 121, forming the desired three-point contact with the conduit.

FIG. 14 shows a fragment of another embodiment of a conduit support 135 that uses two tabs 136 and 137 in one conduit hole 138 of a modified central plate 139 to press against a conduit 51 at two points 140 and 141. It is not necessary for the conduit hole 138 to have a Vee, since the ends of the tabs 136 and 137 form two locating points, and only one more locating point is required to stabilize the conduits. Thus, as in FIG. 13, the conduit hole could be entirely round.

FIG. 15 shows a conduit support 142 with flanges 47 and 48 and a set of concentric, annular knock-outs 143–146. The innermost annulus 143 is attached to the second annulus 144 by two bridges 147, and its central hole 148 just fits the smallest conduit for which this conduit support is designed. When these bridges are broken and the innermost annulus knocked out, the inner perimeter 149 of the second annulus is of the correct diameter to receive the next-larger conduit, and so on for annulus 145 and annulus 146, the latter of which has an outer perimeter 150 that is the largest for this conduit support 142. Each annulus is attached to the one surrounding it by a suitable number of bridges similar to the bridge 147 to allow each annulus to be removed without taking the next-larger one with it. Since each annulus has a diameter that fits closely around the conduit for which it is designed, there is no need for a Vee in any of the annuli.

FIGS. 16 and 17 show a conduit support 151 that has conduit locating means in the form of polygonal conduit holes, such as the triangular hole 152 in its central plate 153, to hold the various sizes of conduits for which it is designed. Straight edges 154 and 156 define two sides of the triangular conduit hole. Only the smallest size of conduit 51 is shown in this figure, and it rests on the two sides 154 and 156 and is held against them by the lower edge of the lowermost slat 157 of a group of straight slats. The ends of the slat 157 are secured to the central plate 153 by bridges 158 and 159, which can be broken to remove the slat to enlarge the conduit hole 152 to receive the next larger conduit. A second slat 161 just above the slat 157 is held in place in the central plate 153 by bridges 162 and 163 at its ends. Above the slat 161 are two more slats 164 and 166, the first of which is held in place by bridges 167 and 168. The final slat 166 in this embodiment is held in place by bridges 169 and 171. Each of these slats has the proper width so that the area bounded by its bottom edge and the sides 154 and 156 fits a specific conduit size, and the appropriate bridges are to be broken out to accommodate the conduit being used.

FIG. 17 shows that the slats are tilted to separate the upper edge of each from the lower edge of the slat next above it. It is undesirable for the lengths of the slats between the respective pairs of bridges to continue to increase, at least in the upper slats 164 and 166, because that would weaken the conduit support 151 too much and would make it necessary to separate the conduit holes. Thus, it is not necessary to provide a triangular hole for the larger conduits. Instead, the bridges 167 and 168 for the slat 164, the bridges 169 and 171 for the slat 166 are successively closer together, making the slats 164 and 166 successively shorter. As a result, the size of the conduit holes formed by removal of the slats converges toward the top, although the size of the conduits that will fit through these holes continues to increase as successive slats are removed.

Figure 18:
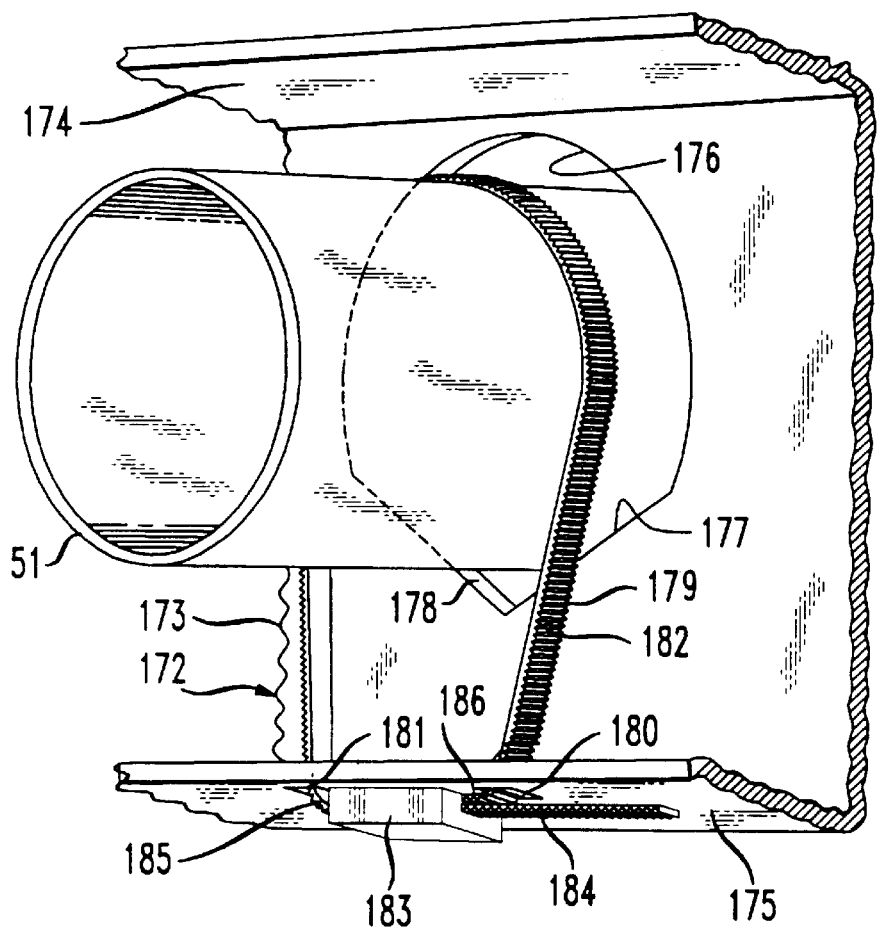
FIG. 18 is a perspective view of a fragment of another form of a conduit support and hold-down means according to this invention.

FIG. 18 shows a fragment of a conduit support 172 that includes a central plate 173, upper and lower flanges 174 and 175, and a conduit hole 176 with a Vee formed by the edges 177 and 178. A conduit 51 is shown extending through the conduit hole, and there is no hold-down tab. Instead, a tie wrap 179 or the like is looped around the conduit and passes through two holes 180 and 181 in the lower flange 175. The tie wrap is a well-known device and consists of an elongated plastic strap that has a serrated surface 182 on one side. At one end is a channel 183 with a resilient pawl inside it to engage the serrations, which face in a direction such that the free end 184 of the strap can be easily inserted into the end 185 of the channel and pulled out through the other end 186 to tighten the loop around the conduit 51 but cannot be pulled back through the channel 183 in the opposite direction.

Figure 19:
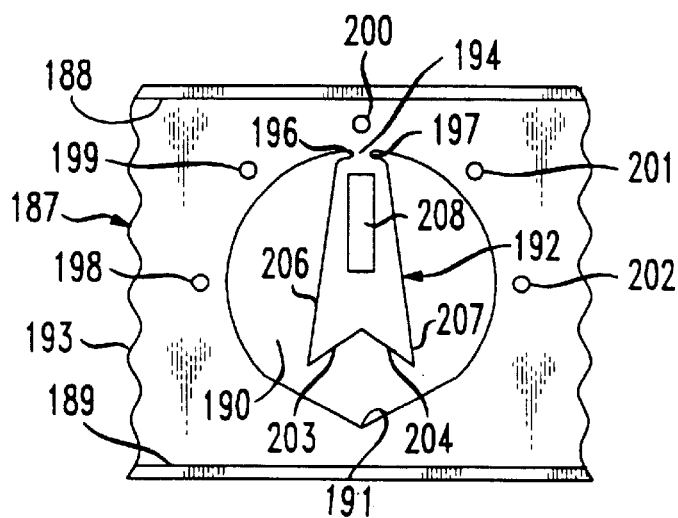
FIG. 19 shows a fragment of yet another embodiment of a conduit support and hold-down means suitable for holding a conduit against different parts of a conduit hole in the conduit support.

FIG. 19 shows a fragment of a conduit support 187 with upper and lower flanges 188 and 189 similar to the flanges 47 and 48 in FIG. 2. The conduit support 187 has a conduit hole 190 of a shape generally similar to the conduit hole 49b in FIG. 5 with a Vee 191 adjacent one flange 189 and a hold-down member, or tab, 192 extending from the perimeter of the hole 190 at the point closest to the other flange 188. The tab 192, being tapered, is somewhat different in shape from the tab 50b in FIG. 5 and is joined to the central plate 193 of the conduit support 187 by a relatively narrow bridge 194, the width of which is limited, in this embodiment, by two notches 196 and 197, which make the bridge weak enough to be broken easily to separate the tab from the central plate.

The tab can then be attached to the central plate by a screw in the manner illustrated in FIG. 10, for example. For this purpose, the central plate has several holes 198–202 angularly space apart around the conduit hole 190 to allow the tab to be attached at any of the locations established by these holes. As in previous embodiments, these holes can be large enough to allow a screw, such as a 6-32, or larger, machine screw to pass through. Alternatively, the holes 198–202 can be small enough to serve as starter holes for a self-tapping sheet metal screw or a tech screw. In addition, the end of the tab 192 has a V-shaped notch defined by edges 203 and 204 in it to embrace a conduit and contact two points of the conduit in the same manner as the tab 120 in FIG. 13. The included angle between these edges can be from about 109° to about 140° to make contact with points well removed from each other on a conduit. The tab 192 is tapered so that its free end, where the edges 203 and 204 are located, is wider than the end where the bridge 194 joins the tab to the central plate 193. This allows the length of each of the edges 203 and 204 to be greater than if the sides 206 and 207 were parallel to each other and spaced apart by only a distance equal to the width of the bridge 194.

The tab 192 has a central slot 208 to allow a screw to pass through it and through one of the holes 198–202, if the tab is separated from the conduit support 187 and attached thereto in the manner described in connection with FIG. 13. The tab 192 is long enough so that it extends almost all of the way across the conduit hole 190. As a result, even if the tab is broken free of the central plate 193 and attached to the central plate by a screw through the slot 208 and the hole 200, the edges 203 and 204 can still be secured in firm contact with the smallest conduit the conduit support 187 is intended to support.

As in the case of the edges 126 and 127 of the Y-shaped tab 120 in FIG. 13, the V-shaped notch defined by the edges 203 and 204 constitutes two of the three contact points desired to fixedly locate a conduit. If it is intended that the tab 192 always be separated from the main part of the conduit support 187 and screwed back on, the Vee 191 will not be necessary.

Figures 20, 21:
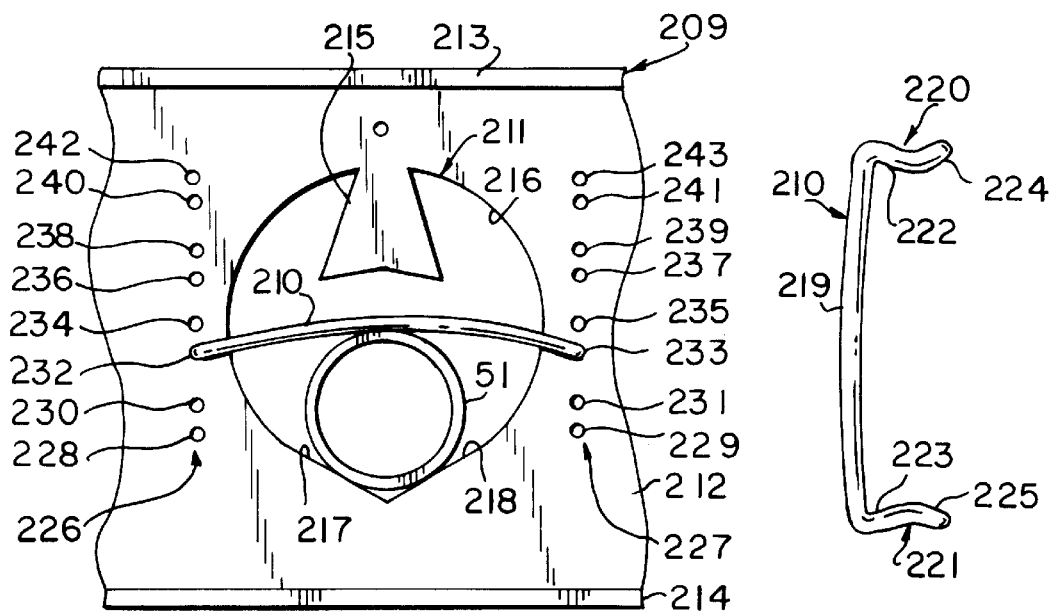
FIG. 20 shows a fragment of a conduit support that is generally similar to the support described in detail in FIG. 2 but modified to use resilient wire clips to hold a conduit in place.
FIG. 21 shows a wire clip of a type suitable for use in the conduit support in FIG. 20.

FIG. 20 is a frontal view of a fragment of a different form of conduit support 209 using separate resilient means 210 to apply pressure to hold a conduit 51 in place in a conduit hole 211. This conduit support is of the same general shape as the conduit support 187 described in FIG. 19 in that it is elongated and includes a central plate 212 with upper and lower flanges 213 and 214 and a tab 215. The perimeter of the conduit hole has a circularly arcuate portion 216 and other portions 217 and 218 that form a V-shaped notch in which the conduit is to stay immobile once it has reached its proper place in the support 209.

In the fragment illustrated in this figure, the resilient means 210 by which the conduit is held in place is a wire clip shown in FIG. 21 as comprising a relatively straight central part 219 and two hooks 220 and 221 that are symmetrical with each other and are much shorter than the central part. In this embodiment, each of the hooks comprises a first part 222 and 223, respectively, bent sharply from a respective end of the central part and in such a way that both of the first parts lie in a single plane along with the central part 219. The two parts 222 and 223 are bent more than 90° at their respective intersections with the central part 219, but each part 222 and 223 is only a little longer than the thickness of the central plate. The purpose of the hooks, in conjunction with the central part, is to fit into an appropriate pair of holes, which will be referred to as wire holes, in the central plate 212 and to cling resiliently to the edges defining those holes. While these holes are referred to as wire holes, the clip 210 could be made of other resilient material besides wire, for example, resilient strap material formed with an elongated central part and hooks at each end. The wire holes could be elongated to accommodate the strap material. To assist in inserting the parts 222 and 223 into a pair of wire holes, each hook includes a diverging part 224 and 225, respectively. Any form of hooks that would grasp the edges of the wire holes securely would be acceptable.

The wire holes are arranged in pairs on opposite sides of the conduit hole 211, and each pair of wire holes is spaced from the flange 214 by a distance less than the distance from the flange 214 to the uppermost part of the surface of the conduit 51 extending through the conduit hole 211. In addition, each pair is slightly closer together than the length of the central part 219 of the clip so that the clip has to be flexed to go over the conduit 51 and have the parts 222 and 223 fit into a pair of the wire holes. It is the resilient tendency of the central part 219 of the wire clip 210 to attempt to return to its natural, straight shape that applies downward pressure on the conduit to force it against the sides 217 and 218 of the V-shaped notch, thereby holding the conduit in place.

Since the conduit hole 211 is intended to be able to receive conduits 51 of a range of sizes, several pairs of wire holes are provided for each conduit hole. It is convenient to arrange these wire holes along two straight lines 226 and 227 spaced equally from a vertical center line of the conduit hole 211 and thus perpendicular to the flanges 213 and 214. This makes it convenient to use the same size wire clip 210 for every type of conduit 51. However, there need not be two sets of wire holes for each conduit hole; each set of wire holes between a pair of conduit holes could serve the conduit holes on each side. The wire holes 228 and 229 forming the lowest pair are spaced from the flange 214 by a distance that allows the central part 219 of the resilient wire clip 210 to fit over a conduit of the smallest size for which the conduit support 209 is designed. In this example, that is assumed to be a ½" EMT conduit, but, of course, the invention is not to be considered as being limited to that or any other specific size. A ½" rigid conduit has a slightly larger diameter than a ½" EMT conduit, and so the wire holes 230 and 231 forming the second pair are located a short distance above the wire holes 228 and 229, respectively. The next larger standard size of conduit is a ¾" EMT type, and the ends of a wire clip 210 to be used with that size conduit would be inserted in the third pair of wire holes 232 and 233, just above which are wire holes 234 and 235 for ¾" rigid conduit. Above those wire holes in this embodiment are four more pairs of wire holes: wire holes 236 and 237 for 1" EMT conduit, wire holes 238 and 239 for 1" rigid conduit, wire holes 240 and 241 for 1¼" EMT, and wire holes 242 and 243 for 1¼ rigid conduit.

The system illustrated in this FIG. 20 shows the installation of a ¾" EMT type conduit 51. After being inserted in the conduit hole 211, the conduit is held down in contact with the portions 217 and 218 of the perimeter of the conduit hole 211 by inserting one hook 220 of the wire clip 210 in the appropriate wire hole 232 and the other hook 221 in the corresponding wire hole 233.

It will be noted that the spacing between each pair of wire holes for a given size rigid conduit is a short distance above the pair of wire holes for EMT conduit of the same nominal size and that such spacing is approximately equal for every size of conduit. It will also be noted that such spacing is less than the vertical spacing between each pair of wire holes for rigid conduit of a given nominal size and the spacing for a pair of wire holes for EMT conduit that is nominally ¼" larger in diameter. The spacing between the two pairs of wire holes for EMT and rigid conduit of each nominal size is substantially equal. However, the spacing between the pair of wire holes for each rigid conduit and the pair for the EMT conduit that is nominally ¼" larger increases a little as the nominal size of the conduit increases.

Figures 22, 23:
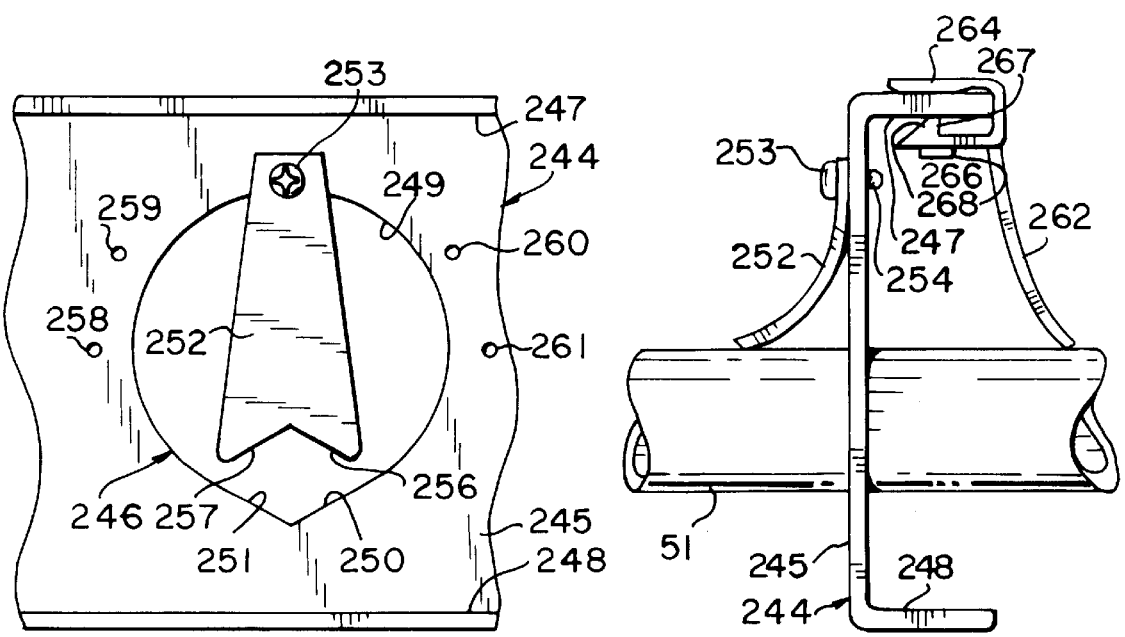
FIG. 22 shows a fragment of a modified conduit support using a resilient hold-down tab in accordance with this invention.
FIG. 23 is a cross-sectional view of the conduit support in FIG. 22.

FIGS. 22 and 23 show a fragment of another conduit support 244 that has a central plate 245. As in other embodiments described previously herein, the central plate has a plurality of conduit holes, of which the hole 246 is one example, and upper and lower longitudinal flanges 247 and 248. The conduit hole 246 is similar to the conduit holes in other embodiments in that it has a circularly arcuate portion 249 and two other portions 250 and 251 that form a V-shaped notch in which a conduit is to stay immobile once it has reached its proper place in the support 244.

The important difference in this embodiment is the resilient means used to hold conduits substantially motionless in the conduit holes. Instead of the resilient wire clip 210 used in FIG. 20, the resilient means in FIGS. 22 and 23 constitute a resilient tab 252 attached to the central plate 245 in position to extend over a substantial part of the conduit hole 246. In this embodiment, the resilient tab is attached to the conduit support 244 by a screw 253 extending through a hole 254 in the central plate. As previously described herein, the screw 253 could be self-tapping or a nut could be used to hold it in place or the central plate 245 could have a thread impression formed around the hole 254. Alternatively, the tab could be held in place by a brad or it could be provided with a U-shaped upper end having barbs and adapted to be forced onto an edge of the conduit support 244, either at the hole 246 or at the flange 247, and held there by its own resilient force and by the frictional effect of the barbs.

While the outline of the resilient tab 252 in this embodiment is similar to that of the tab 192 in FIG. 19, the tab 252 does not have a central slot because none is needed. Instead of being moved perpendicularly into contact with a conduit of any size that can be inserted in the conduit hole, as is the case with the tab 50c in FIG. 8, the resilient tab 252 in this embodiment is to be held in one position suitable to engage a conduit of even the smallest diameter. Not only is the tab 252 long enough to engage any conduit, but it is long enough to be flexed by the conduit to produce the force necessary to keep the conduit in place in the V-shaped notch formed by the portions 250 and 251 of the conduit hole 246. The required force is not very large; only a pound or so is sufficient.

The bottom end of the tab 252 could extend straight across from side to side, but it is preferable, as shown in this embodiment that the end of the tab have an inverted V-shaped notch defined by edges 256 and 257 that could provide two locating points to engage the conduit 50c. This would keep the tab from being rotated out of position on the screw 253, and it would also make it possible for the conduit hole 246 to be entirely round, as described in connection with the embodiment in FIG. 19.

Whether the conduit hole is entirely round or not, if the conduit support 244 is installed so that its longitudinal flanges 247 and 248 are vertical, it would be desirable for the tab to be shifted about 90° around the center of the conduit hole 246 relative to the position in which it is shown in FIG. 22. This would permit the tab to exert the same downward force on the conduit as is exerted when the conduit support 244 is horizontal in the normal trapeze direction. For this purpose, four more holes 258–261 have been provided, two on each side of the conduit hole 246 to accommodate the screw 253 in any of such positions, depending on the angle at which the conduit support 244 is to be supported.

FIG. 23 shows another resilient tab 262 attached to an edge of the conduit support 244, specifically, in this instance, an edge of the upper flange 247. The tab 262 has a generally U-shaped clip 263 at one end with the main portion of the tab extending downwardly from the clip and into resilient engagement with the conduit 51. The U-shaped clip has two portions 264 and 266 that are strongly resiliently biased toward each other to clamp firmly onto the edge of the flange 247. In addition, one of these portions has barbs, of which only the barb 267 is shown, to dig into the surface of the flange 247 and prevent the tab 262 from being easily removed. The flange 247 has holes like the holes 54 and 56 in the flange 47 in FIG. 2. If greater holding power is required to keep the tab 252 from slipping off the flange 247, the upper portion 264 of the clip may be provided with an opening through which a screw may pass, and the lower portion 267 of the clip 263 may include a thread impression 268 to be aligned with one of the holes 56 to receive the screw. It is to be understood, of course, that only the tab 252 or the tab 262 would be used at a given conduit hole, not both at once. They are both shown in this figure merely for convenience.

While this invention is described in terms of specific embodiments, it will be recognized by those familiar with this technology that various components of these embodiments can be combined with each other and that still other modifications may be made in the original and any modified embodiments without departing from the scope of this invention.

What is claimed is:

1. An elongated conduit support comprising:
   (a) a generally flat, central plate having first and second longitudinal side edges and first and second end edges shorter than the side edges;
   (b) a plurality of conduit holes through the central plate and spaced apart therealong, each hole to receive a conduit therethrough and having a closed perimeter whereby movement of the respective conduit in a hole in a direction parallel to the central plate is limited to an area bounded by the perimeter of the conduit hole;
   (c) first and second strengthening flanges extending along the longitudinal side edges of the central plate and bent away from the plane to form, with the plate, a structure having a generally U-shaped cross section to prevent buckling of the central plate perpendicular to the longitudinal side edges due to the weight of the conduits extending through the conduit holes;
   (d) adjustable conduit-restraining means located at each conduit-receiving hole and secured to the central plate to engage any conduit extending through the respective conduit hole to further limit any movement of such conduit in a direction parallel to the central plate; and
   (e) a plurality of first passageways through the first flange, and a corresponding plurality of second passageways through the second flange and aligned with the first passageways to permit a separate support rod to pass through each pair of aligned first and second passageways generally parallel to the central plate and perpendicular to the longitudinal side edges.

2. The conduit support of claim 1 in which each conduit hole has a perimeter that includes first and second generally angularly disposed edge portions converging toward a common point and defining a V-shaped notch, and the conduit-restraining means comprises the V-shaped notch to restrain the conduit from rolling in the respective conduit hole.

3. The conduit support of claim 2 in which the conduit-restraining means further comprises a tab having first and second ends, the first end being joined to the central plate at the side of the perimeter of each conduit hole opposite the V-shaped notch in the perimeter of that hole, and the second end extending sufficiently far across that conduit hole to engage a conduit of predetermined minimum diameter inserted in the conduit hole between the second end of the tab and the edges defining the V-shaped notch.

4. The conduit support of claim 1 in which the conduit-restraining means further comprises a tab having first and second ends, the first end being joined to the central plate at a first side of the perimeter of each conduit hole, and the second end extending sufficiently far across that conduit hole to engage a conduit of predetermined minimum diameter inserted in the conduit hole between the second end of the tab and a part of the perimeter of the conduit hole at a second side of the perimeter opposite the first side.

5. The conduit support of claim 4 in which the tab is integrally formed with the central plate.

6. The conduit support of claim 4 in which: the second end of the tab has a notch defined by first and second edges of the second end converging toward a common point, the edges providing two contact locations with the conduit.

7. The conduit support of claim 4 in which the tab is sufficiently flexible to be bent to displace the second end sufficiently to permit a conduit of a larger size, up to a predetermined maximum size, to be inserted between the second end and the opposite side of the perimeter.

8. The conduit support of claim 1 in which the conduit-restraining means are separate from the central plate, and the conduit support comprises attachment means to join the conduit-restraining means to the central plate.

9. The conduit support of claim 8 in which the attachment means comprises screws to attach the conduit-restraining means to the central plate at selected locations adjacent the conduit hole perimeters.

10. The conduit support of claim 9 in which the attachment means comprises a thread impression to engage the screw.

11. The conduit support of claim 8 in which the attachment means comprises resilient clamping means to attach the tab to the central plate along an edge thereof.

12. The conduit support of claim 1 in which the conduit-restraining means comprise a plurality of flexible tie-wraps to form a plurality of closed loops, each of the loops extending through a hole in one of the flanges adjacent a respective conduit-receiving hole and around a conduit in that hole to prevent the conduit from moving away from said one flange.

13. A conduit support comprising:
 (a) a central plate elongated in a longitudinal direction in a plane and having longitudinal edges and front and rear surfaces;
 (b) conduit holes in the elongated plate spaced apart in the longitudinal direction and located in defined areas of the plate to receive conduits, each of the conduit holes having a closed perimeter;
 (c) first and second reinforcing flanges comprising portions of the longitudinal edges bent in the same direction to reinforce the conduit support and prevent it from bending under the combined weight of the conduits passing through the holes; and
 (d) portions of the conduit support defining first and second passageways integrally formed with the plate parallel to the plane and perpendicular to the longitudinal edges of the central plate to permit separate support rods to pass through the passageways generally parallel to the plate and perpendicular to the longitudinal side edges.

14. The conduit support of claim 13 comprising, in addition, means at each conduit hole to restrain movement of the conduit in the respective hole, said means including three surfaces to contact points separated from each other around the conduit.

15. The conduit support of claim 14 in which the means at each conduit hole to restrain movement of the conduit comprises:
 (a) an edge surface portion of each conduit hole, said edge surface portion making contact with the conduit at at least one point; and
 (b) hold-down means comprising a surface making contact with the conduit at at least one point.

16. The conduit support of claim 15 in which the hold-down means at each conduit hole to restrain movement of the conduit is resilient.

17. The conduit support of claim 16 in which the resilient hold-down means comprises:
 (a) an elongated resilient restraining member long enough to extend across a conduit hole; and
 (b) a pair of restraining-member holes, one on each side of said conduit hole, each of the restraining-member holes having an edge, the elongated resilient restraining member being long enough to stretch over the conduit in contact therewith and to allow one of the ends of the resilient restraining member to enter one hole of the pair of holes and engage the edge of that hole and to allow the other of the ends of the resilient restraining member to enter the other hole of the pair of holes and engage the edge of that hole.

18. The conduit support of claim 14 in which:
 (a) each of the conduit holes includes edge portions that meet at an angle at a point of intersection proximal to the first flange; and
 (b) the conduit-restraining means extend from edge portions of each of the conduit holes at least part of the way across the respective conduit hole.

19. The conduit support of claim 14 in which each conduit-restraining means is integrally formed as a severable edge portion of the defined areas.

20. The conduit support of claim 14 in which the conduit-restraining means comprises:
 (a) two side arms, one end of each of which is formed integrally with an edge portion of a respective one of the defined areas;
 (b) a bight joining the side arms together at the ends of the side arms remote from said edge portion, each of the conduit-positioning members being formed integrally with and frangibly attached to the edge portion of the respective one of the conduit holes, whereby each of the conduit-positioning members can be broken free of the central plate; and
 (c) attachment means to attach the respective conduit-positioning member to the central plate adjacent the respective conduit hole and extending part way across the respective hole to engage a conduit inserted through the hole.

21. The conduit support of claim 20 in which the attachment means for each conduit-positioning member is a screw extending through a hole in the central plate adjacent the respective conduit hole.

22. The conduit support of claim 13 comprising, in addition, conduit-restraining means comprising knock-out portions of the central plate forming at least part of the perimeter of each the conduit-receiving holes.

23. The conduit support of claim 13 comprising, in addition, conduit-restraining means that comprise deformable tabs, each formed integrally with the central plate as part of one of the defined areas and extending part way across the respective conduit hole toward opposite edge portions of the respective defined area.

24. The conduit support of claim 23 in which each of the tabs comprises:
 (a) a straight portion extending from one side of a respective one of the conduit holes toward the opposite side of that conduit hole: and
 (b) two edges at the end of the straight portion proximal to the opposite side, the edges being at an angle less than 180° to each other to engage two points on a conduit inserted through that conduit hole.

25. The conduit support of claim 13 in which the central plate comprises reinforcing means to prevent buckling thereof perpendicular to the longitudinal side edges.

26. The conduit support of claim 25 in which the reinforcing means comprise ridges formed in the central plate extending transversely with respect to the longitudinal side edges and between the defined areas.

27. The conduit support of claim 25 in which the reinforcing means comprise end portions of the central plate bent out of the plane thereof adjacent the end edges.

28. The conduit support of claim 25 in which the end portions, the flanges, and the central plate form a shallow, elongated box.

29. The conduit support of claim 13 comprising, in addition: engaging means at predetermined locations along the conduit support to engage suspension means and hold the conduit support in a substantially fixed position.

30. The conduit support of claim 13 in which the conduit support comprises modularly severable sections, each comprising a plurality of the conduit holes and the engaging means at each end of each of the sections.

31. The conduit support of claim 13 in which:
   (a) the first and second flanges are flat and extend parallel to each other in the same direction from longitudinal side edges of the central plate;
   (b) the first passageway comprises a first set of holes comprising first and second aligned holes in the first and second flanges, respectively, adjacent one end thereof;
   (c) the second passageway comprises a second set of holes comprising third and fourth aligned holes in the first and second flanges, respectively, adjacent the opposite end thereof, whereby the conduit support can be suspended from the rods with the central plate substantially vertical; and
   (d) additional, aligned holes forming additional passageways between the first and second passageways in the first and second flanges to allow the support to be cut in two parts, each of which parts will have a pair of aligned holes in the first and second flanges thereof adjacent each end thereof.

32. An elongated conduit support comprising:
   (a) a generally flat, central plate having longitudinal side edges and transverse end edges shorter than the side edges;
   (b) first and second flanges extending parallel to each other from opposite longitudinal side edges of the central plate to define, with the central plate, a channel having a generally U-shaped cross-sectional configuration;
   (c) a plurality of conduit holes through the central plate and spaced apart along the central plate;
   (d) adjustable conduit-positioning means extending at least part way across each of the conduit holes to exert pressure on a conduit through the respective conduit hole;
   (e) a plurality of first passageways through the first flange, and a corresponding plurality of second passageways through the second flange and aligned with the first passageways to permit a separate support rod to pass through each pair of aligned first and second passageways generally parallel to the central plate and perpendicular to the longitudinal side edges.

33. The conduit support of claim 32 in which the passageways in the first and second flanges define round openings substantially tangent to the proximal surface of the central plate.

34. The conduit support of claim 32 in which each of the passageways comprises transversely offset portions of the central plate.

35. The conduit support of claim 32 comprising a plurality of screw holes in the first flange, each of the screw holes being aligned between a pair of the conduit holes to receive a conduit holding device.

36. The conduit support of claim 32 comprising a plurality of screw holes in the first flange, each of the screw holes being aligned with a respective conduit hole to receive a conduit-positioning means.

* * * * *